United States Patent [19]
Abell

[11] Patent Number: 5,339,772
[45] Date of Patent: Aug. 23, 1994

[54] SMALL ANIMAL RESTRAINER

[76] Inventor: Petra Abell, 412 Hudson St., Redwood City, Calif. 94062

[21] Appl. No.: 156,056

[22] Filed: Nov. 22, 1993

[51] Int. Cl.⁵ .............................................. A01K 13/00
[52] U.S. Cl. .................... 119/724; 119/723; 119/756
[58] Field of Search ............... 119/712, 722, 723, 724, 119/753, 754, 755, 756, 757

[56] References Cited

U.S. PATENT DOCUMENTS

| | | | |
|---|---|---|---|
| 556,778 | 3/1896 | Schneider | 119/723 |
| 2,566,013 | 8/1951 | Abernathy | 119/723 |
| 2,581,735 | 1/1952 | Turner | 119/723 |
| 2,700,957 | 2/1955 | Keirsey | 119/723 |
| 2,753,842 | 7/1956 | Thorson | 119/723 |
| 4,590,887 | 5/1986 | Holopainen | 119/723 |

FOREIGN PATENT DOCUMENTS

| | | | |
|---|---|---|---|
| 1644945 | 4/1991 | U.S.S.R. | 119/723 |
| 2046068 | 11/1980 | United Kingdom | 119/724 |

Primary Examiner—John G. Weiss

[57] ABSTRACT

A portable animal restrainer comprising a flooring surface secured within a stable framework that is rotatable so as to position the animal correctly and less stressfully for oral dosing. A small animal such as a rabbit is placed inside and secured using an adjustable back plate, body and neck straps, and a fixed neck and paw plate, thus restraining the animal from movement while the unit is rotated on the restrainer's rear tracks to position the animal for various dosing techniques.

6 Claims, 4 Drawing Sheets

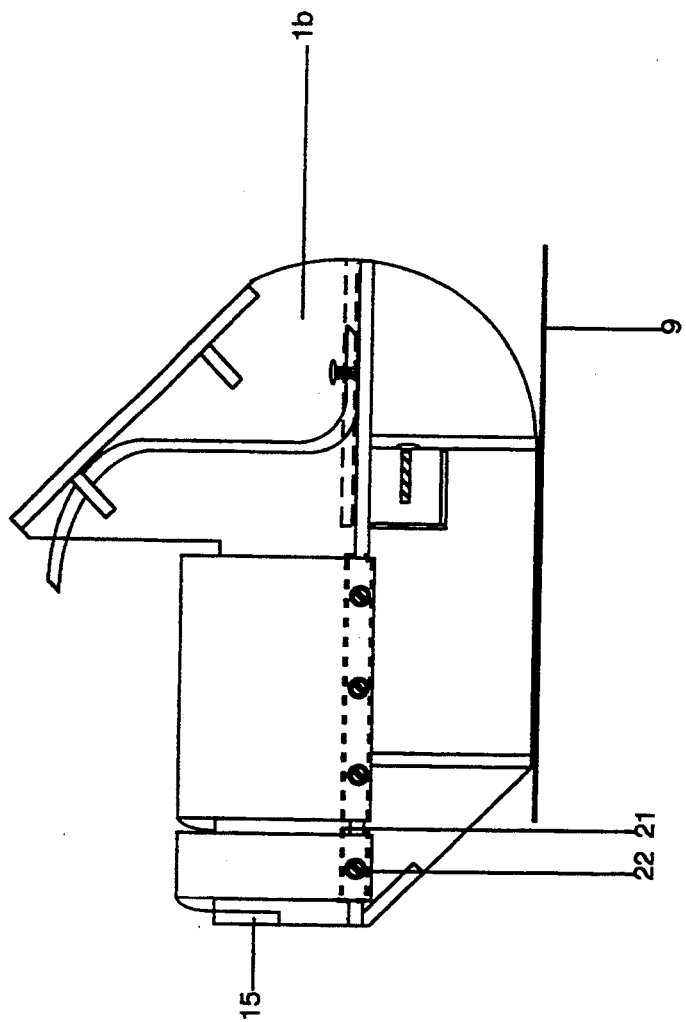

005,339,772

SMALL ANIMAL RESTRAINER

BACKGROUND OF THE INVENTION

This invention pertains to the temporary restraining of small animals, particularly for administering oral doses of medications. The small animals often panic and can easily injure both the handler and itself, and can also cause the administration to be misdosed, which may lead to erroneous data, unwanted clinical effects, and possible animal death. Therefore, the oral dosing procedure is both time consuming and labor intensive, requiring as many as three persons to execute with safety and efficacy.

This invention presents a novel apparatus in which to complete the oral dosing procedure with increased safety to the restrained animal, increased efficacy of the dosing procedure, increased handler safety, and decreased labor intensity.

It is the primary object of this invention to provide a sturdy, sanitizable, portable restrainer that is operable by one animal handler.

It is further an object of this invention to provide a restrainer that presents the animal to the handler in a position that streamlines the oral dosing procedure, and results in increased safety for the handler and the animal being restrained.

It is further an object of this invention to provide a less stressful environment for the restrained animal by providing a better-tolerated restraint method.

SUMMARY OF THE INVENTION

This invention provides an apparatus for restraining and positioning a small animal. This apparatus comprises a floor plate supported by side walls shaped to allow the unit to be rotated rearwardly about its lateral axis, an adjustable, supporting back plate, a fixed front plate to contain the animals neck and paws, and a pliable back and neck strap to support the animals back and neck, respectively. The apparatus incorporates a handle at the front section of the restrainer to aid in its rotation and transport, and includes a counterweight to ease its rotation and offer stability in the rotated position.

BRIEF DESCRIPTION OF THE DRAWINGS

FIG. 3 is a view of the left side of the restrainer.

DESCRIPTION OF THE PREFERRED EMBODIMENT

Figure 1:
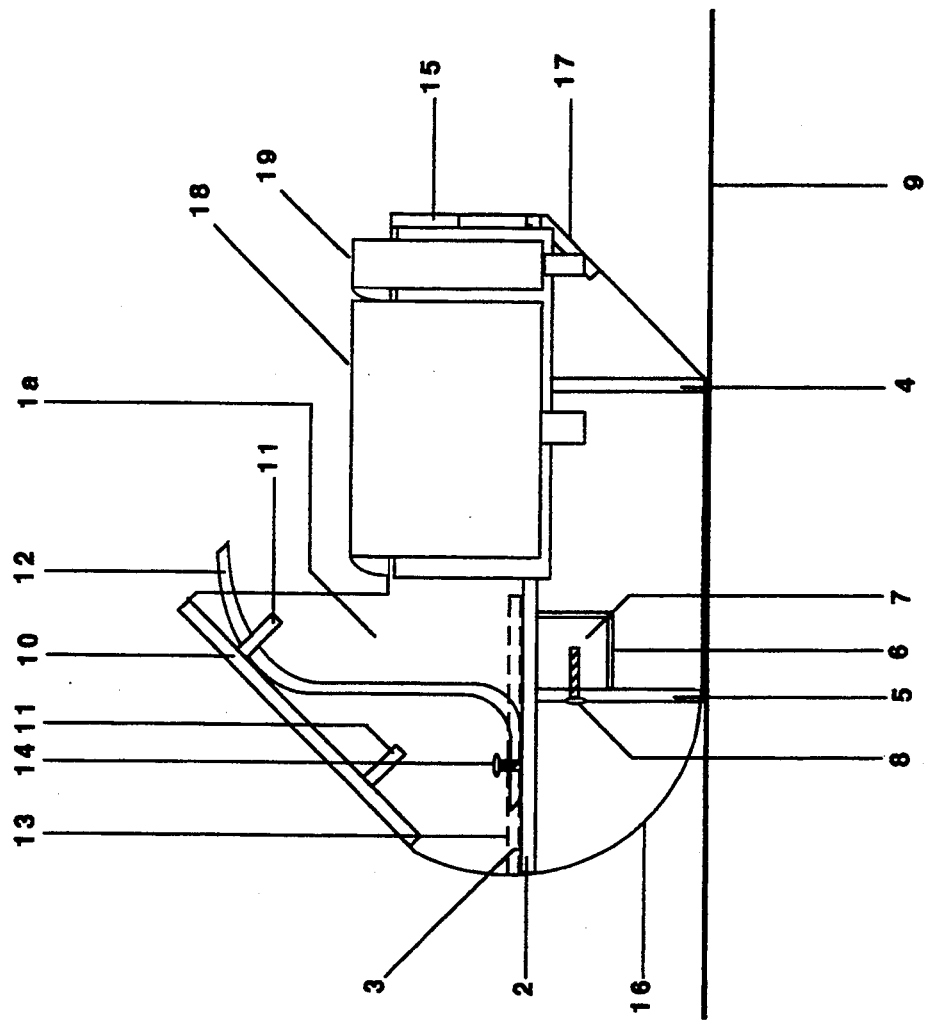
FIG. 1 is a view of the right side of the restrainer.
Figure 2:
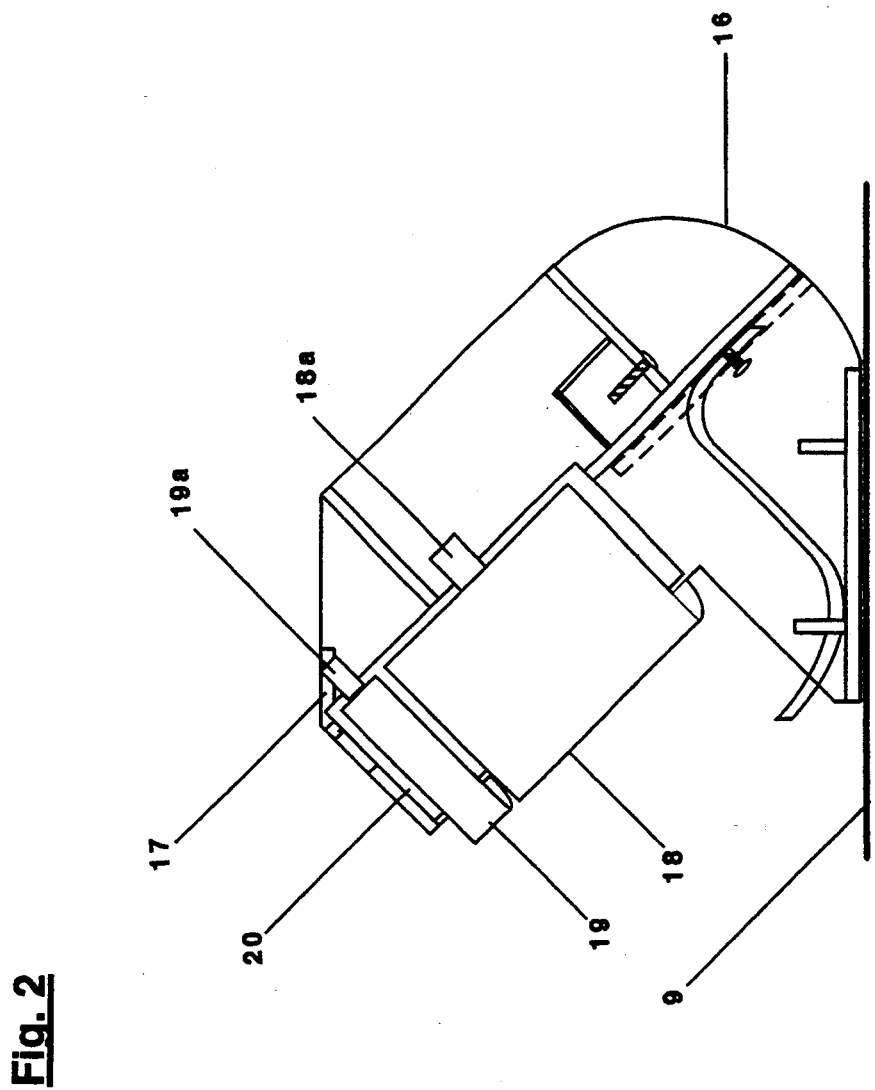
FIG. 2 is a view of the right side of the restrainer in the rotated position.

FIG. 1, 2, and 3 are shown using a horizontal reference line 9.

FIG. 1 shows the right side wall 1a attached to the floor plate 2, which has a self-adhesive non-slip surface 3 attached to it. The front main wall brace 4 attaches to both the left and right side walls 1a and 1b, as well as the floor plate 2. The rear main floor brace 5, attaches to the side walls 1a, 1b, floor plate 2, and the counterweight encasement 6, which houses the lead counterweight 7. The counterweight is affixed to the rear main floor brace 5 by way of a screw type attachment 8, and may be glued onto the attached surfaces 1a, 1b, 2, and 5 for additional support.

Lateral support legs 10 are attached to each side wall 1a, 1b at 90 degree angles projecting outward to offer lateral support while the restrainer is being used in the rotated position. Lateral support legs are fortified by the use of two triangular angle braces 11.

Back plate 12 is inserted from the rear of the restrainer and adjustable within a groove 13 routed into each side of the side walls 1a, 1b just above the floor plate 2. Set screw 14 is used to stabilize the back plate 12 into a position that will fit an individual animal.

Figure 5:
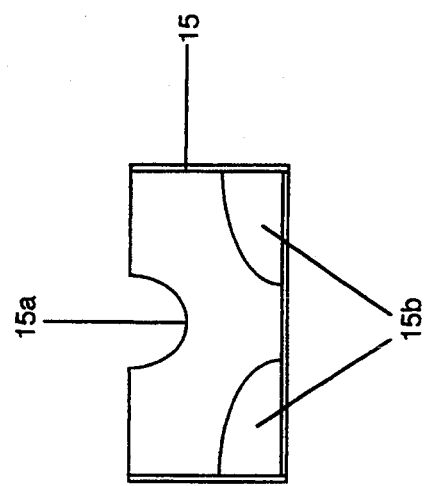
FIG. 5 is a view of the neck and paw plate.

FIG. 1 and FIG. 3 show the neck plate 15 attached to the side walls 1a and 1b and the floor plate 2. FIG. 5 shows the neck support 15a, where the animal's neck rests, and the paw position holes 15b, which allow the animal's paws to project through the plate to allow proper positioning of the shoulders.

FIG. 2 shows the restrainer in the rotated position. The restrainer is rotated approximately 135 degrees along the curved edges 16 formed by the side walls 1a and 1b. Handle 17 is attached to both side walls 1a and 1b, and the floor plate 2, and facilitates the rotation of the restrainer and allows for easy transportation of the unit. Body strap 18 and neck strap 19 attach to correlating Velcro ® surface 20 which is affixed to the right main wall 1. Body strap 18 is fitted with tab 18a and neck strap 19 is fitted with tab 19a to ease attachment and detachment of the straps.

FIG. 3 shows the left side of the restrainer. A metal bar 21 is incorporated within the body strap 18 and neck strap 19 to provide strength to the screw type attachments 22 which fix the body strap 18 and neck strap 19 to the left side wall 1b.

Figure 4:
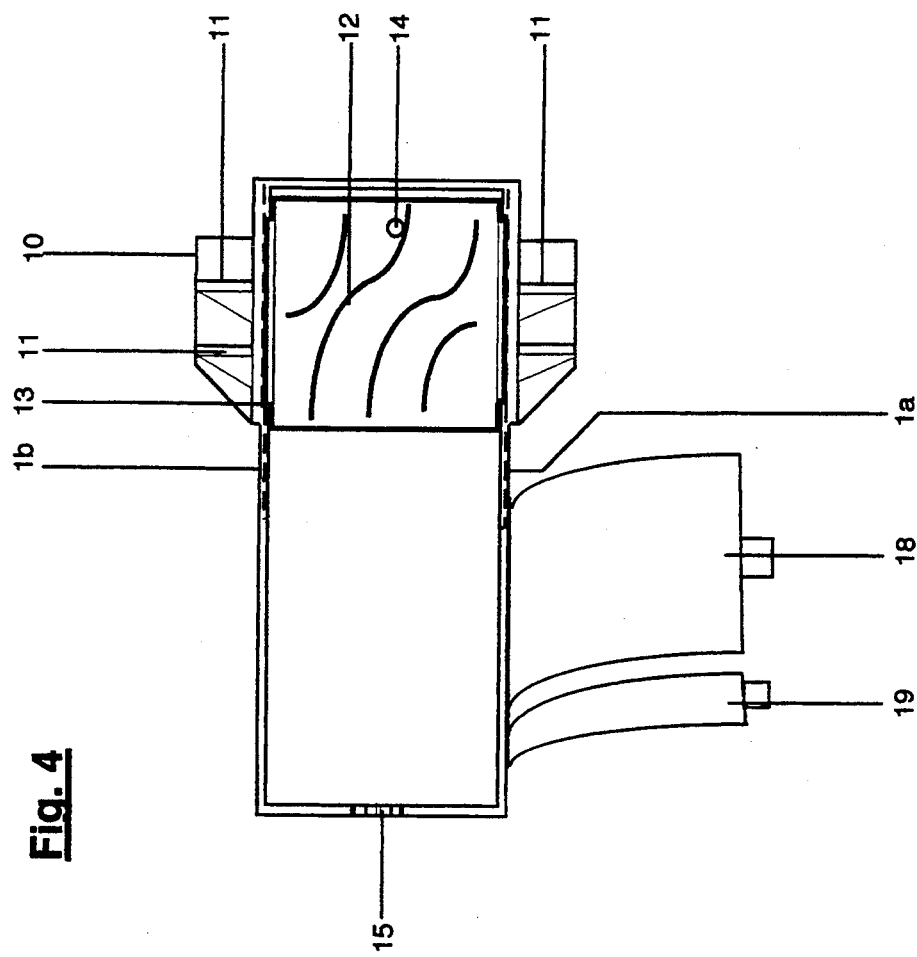
FIG. 4 is a top view of the restrainer.

FIG. 4 shows a top view of the invention. Lateral support legs 10 are shown attaching to the side walls 1a and 1b with triangular angle braces 11. The back plate 12 is shown with the groove 13 routed within the each of the main walls 1 and 1a. Body strap 18 and neck strap 19 are shown in this figure in the open position.

In operation, the restrainer initially is resting in the manner depicted in FIG. 1, and the back plate 12 is removed by loosening the set screw 14 and unfastening the body strap 18 and neck strap 19. The animal is placed into the restrainer and the back plate 12 is inserted into the unit and adjusted to fit the specific animal while the body strap 18 and neck strap 19 are fastened to the right side wall 1a. The neck of the animal should rest upon the neck support 15a within the neck and paw plate 15. The restrainer then is grasped by the handle 17 and rotated counterclockwise (if viewed from the right side of the restrainer) along the curved edges 16 until the unit stops and rests upon the lateral support legs 10. The unit is self standing in the rotated position, which leaves both the handler's hands free to proceed with dosage administration.

As used herein, the term small animal refers to animals weighing less than about 50 kilograms, preferably less than about 20 kilos, most preferably less than about 10 kilograms. Representative animals include small dogs, cats, and rabbits, particularly New Zealand white rabbits.

The invention may take other forms, but is preferably constructed using ½-inch Plexiglas ® to provide durability. The counterweight is lead, and the body and neck straps are preferably made of canvas, but may be constructed of other material. In one embodiment, the overall dimensions are about 18 inches in length, 7 inches in height in the front and 12 inches in height in the rear, and 7 inches in width.

The means for securing the animal is preferably a flexible fabric attached to the side walls by suitable fastening means. Such means includes hooks and eyes, snaps, buttons, zippers, and the like. In one form the fabric is permanently attached to one wall.

I claim:

1. A device for restraining and positioning a small animal, comprising:
   (a) two rigid, parallel side walls, each of said side walls having a plurality of edges, including a first flat bottom edge for resting on a horizontal surface, including also a second flat edge joined to the first flat edge by a curved edge having an exterior arc of approximately 135 degrees;
   (b) a floor plate secured between said side walls above said bottom edge;
   (c) a counterweight below said floor plate
   (d) an adjustable back plate between said side walls adapted for longitudinal movement along and above said floor plate;
   (e) a means for securing the said adjustable back plate in a fixed position along said floor plate;
   (f) a neck and paw plate opposite said adjustable back plate, mounted between said side walls and above said floor plate;
   (g) a body and neck strap adapted to secure the small animal in the device.

2. A device of claim 1 wherein said curved edge provides a means by which the device is rotated into a position so as to facilitate a procedure or operation.

3. A device of claim 1 wherein it comprises a means of stabilizing the device in the rotated position.

4. A device of claim 1 wherein the body and neck strap is made of a flexible material of size sufficient to enclose the animal within the device.

5. A device of claim 1 wherein said floor plate has a non-slip surface.

6. A device of claim 1 wherein the side walls have grooves therein for longitudinal movement of said adjustable back plate.

* * * * *